United States Patent
Zeng et al.

(10) Patent No.: US 6,441,678 B1
(45) Date of Patent: Aug. 27, 2002

(54) SELF INITIALIZATION FORCHARGE PUMPS

(75) Inventors: Raymond W. Zeng; Bo Li, both of Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/051,696

(22) Filed: Jan. 17, 2002

Related U.S. Application Data (63) Continuation of application No. 09/752,247, filed on Dec. 27, 2000, now Pat. No. 6,366,158.

(51) Int. Cl.[7] .............................................. G05F 1/10
(52) U.S. Cl. ......................................................... 327/536
(58) Field of Search .................................. 327/530, 534, 327/536, 535, 537

(56) References Cited

U.S. PATENT DOCUMENTS

| | | | |
|---|---|---|---|
| 5,059,815 A | 10/1991 | Bill et al. | 307/296.2 |
| 5,986,947 A | 11/1999 | Choi et al. | 365/189.11 |
| 6,255,896 B1 | 7/2001 | Li et al. | 327/536 |
| 6,292,048 B1 | 9/2001 | Li | 327/536 |
| 6,297,687 B1 | 10/2001 | Sugimura | 327/536 |

*Primary Examiner*—Jeffrey Zweizig
(74) *Attorney, Agent, or Firm*—Peter Lam (57) ABSTRACT

A method and apparatus for self initialization for charge pumps. The method of one embodiment comprises generating a pumped voltage at an output of the circuit. The pumped voltage is sent to a first switch. A determination is made as to whether the circuit is in a first power state. The first switch is activated to couple the pumped voltage to an initialization mechanism if the circuit is in said first power state. An internal pump node in the circuit is initialized to a first voltage potential. The first switch is deactivated to decouple the pumped voltage from the initialization mechanism after the internal pump node is charged to desired level.

20 Claims, 5 Drawing Sheets

SELF INITIALIZATION FORCHARGE PUMPS

This patent application is a Continuation of U.S. patent application Ser. No. 09/752,247, entitled "Self Initialization For Charge Pumps", filed Dec. 27, 2000, now U.S. Pat. No. 6,366,158.

FIELD OF THE INVENTION

The present invention relates generally to the field of computers and computer systems. More particularly, the present invention relates to a self initialization for charge pumps.

BACKGROUND OF THE INVENTION

Many of today's computing applications such as cellular phones, digital cameras, and personal computers, use nonvolatile memories to store data or code. Nonvolatility is advantageous because it allows the computing system to retain its data and code even when power is removed from the computing system. Thus if the system is turned off or if there is a power failure, there is no loss of code or data.

One example of a nonvolatile memory device is the flash Electrically Erasable Programmable Read-only Memory (flash EEPROM or flash memory). Flash memory can be programmed by the user, and once programmed, the flash memory retains its data until the memory is erased. Electrical erasure of the flash memory erases the contents of the memory of the device in one relatively rapid operation. The flash memory may then be programmed with new code or data.

Flash memories have been used in portable computers and similar circuitry as both read only memory and as long term storage which may be both read and written. However, the tendency has been to reduce the power requirements of such portable computers to make systems lighter and to increase the length of use between recharging. This has required that the voltage potentials available to program the flash memory arrays be reduced. Flash memories must be able to operate in systems where a VCC supply voltage of 5V, 3V, or an even smaller voltage is available to circuit components. However, performing program and erase operations in flash memory components requires that greater voltage than that supplied to the component be applied to the flash memory cells. For example, a program operation may require that approximately 10.5V be applied to a memory cell. In order to achieve this voltage, a charge pump circuit is required in the flash memory component. A positive charge pump can take a supplied VCC voltage and create a voltage sufficient for program operations. The charge pump must also be able to deliver sufficient current at the required voltage levels.

Typically, the voltage levels within a charge pump is reduced to a ground potential when the pump is placed into a low power state such as shutdown, power off, standby, etc. Furthermore, the various capacitors used to store charge are discharged. When the charge pump goes back into a high power state such as active mode, all the internal pump nodes and capacitors need to be precharged back to their equilibrium levels before the pump circuit can produce a steady current at the requisite output voltage level. Valuable time and power can be expended and wasted in discharging and then precharging these internal nodes and capacitors if a charge pump is constantly being transitioned between a low power state and a high power state.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and apparatus for a self initialization for charge pumps is disclosed. The embodiments described herein are described in the context of a memory, but are not so limited. Although the following embodiments are described with reference to flash memory, other embodiments are applicable to other integrated circuits or logic devices. The same techniques and teachings of the present invention can easily be applied to other types of circuits or semiconductor devices that use charge pumps.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

Embodiments of the present invention can assist in improving charge pump warm up times by initializing internal pump nodes. By initializing the internal pump nodes, a charge pump can be more ready to operate and produce a steady current when coming out of a lower power mode such as standby or shutdown. Without initialization, the internal pump nodes and capacitors would have to be charged up from a ground potential every time the pump was activated after a low power mode. The charge available at the output of the charge pump during exit of an active mode is used to initialize and precharge the internal pump nodes to an equilibrium level. The use of this self initialization scheme can enable the design of flash products that have faster programming speed. Furthermore, the improved pump slew rates of VCC initialized pump nodes can allow for smaller pump array sizes, which leads to die area savings. Program power consumption may also be reduced in a charge pump including an embodiment of this self initialization scheme.

Figure 1:
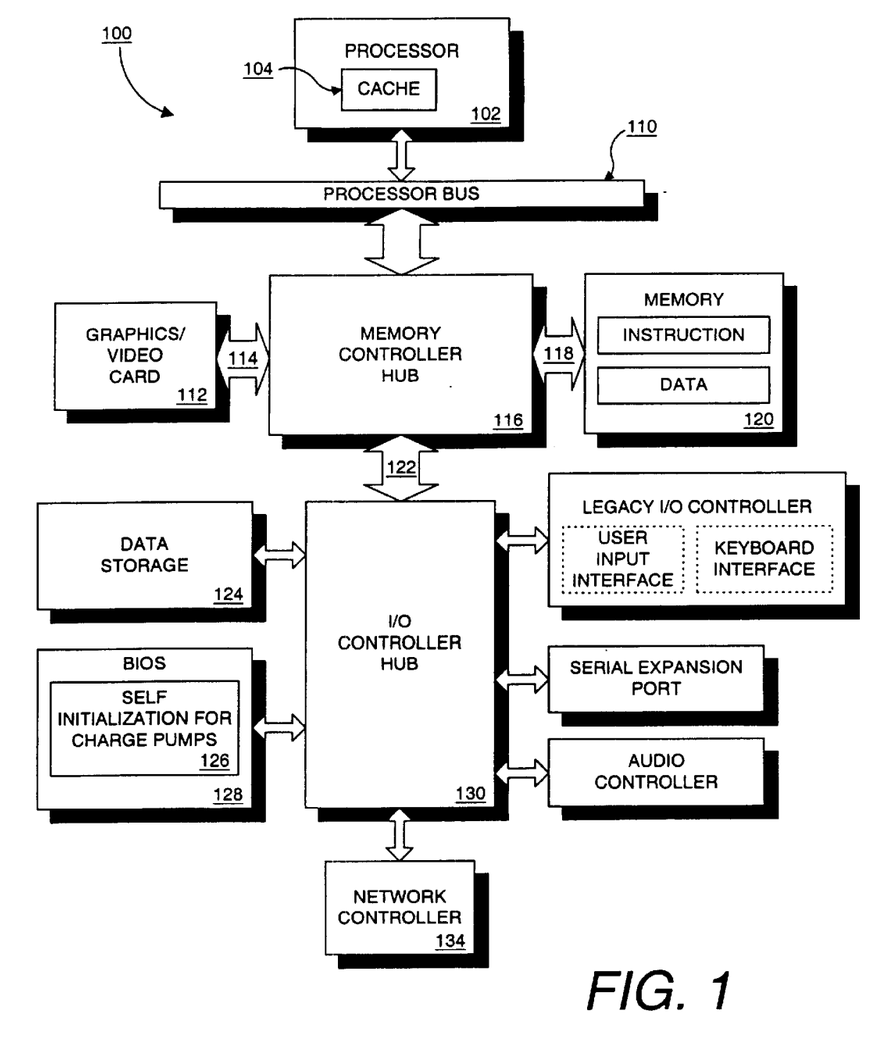
FIG. 1 is a computer system utilizing one embodiment of self initialization for charge pumps.

Referring now to FIG. 1, an exemplary computer system 100 is shown. System 100 includes a component, such as a processor, employing self initialization for charge pumps in accordance with the present invention, such as in the embodiment described herein. System 100 is representative of processing systems based on the PENTIUM® Pro, PENTIUM® II, PENTIUM® III, Itanium® microprocessors available from Intel Corporation of Santa Clara, Calif., although other systems (including PCs having other microprocessors, engineering workstations, set-top boxes and the like) may also be used. In one embodiment, sample system 100 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which uses a latch type mechanism for other embodiments.

FIG. 1 is a block diagram of one embodiment of a system 100. System 100 is an example of a hub architecture. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented in a single processor system 100. However, it is understood that other embodiments may alternatively be implemented as systems having multiple processors. Processor 102 is coupled to a processor bus 110 that transmits data signals between processor 102 and other components in the system 100. The elements of system 100 perform their conventional functions well known in the art.

System 100 includes a memory 120. Memory 120 may be a dynamic random access memory (DRAM) device, a static random access memory (SRAM) device, flash memory device, or other memory device. Memory 120 may store instructions and/or data represented by data signals that may be executed by processor 102. A cache memory 104 can reside inside processor 102 that stores data signals stored in memory 120. Alternatively, in another embodiment, the cache memory may reside external to the processor.

A system logic chip 116 is coupled to the processor bus 110 and memory 120. The system logic chip 116 in the illustrated embodiment is a memory controller hub (MCH). The processor 102 communicates to the MCH 116 via a processor bus 110. The MCH 116 provides a high bandwidth memory path 118 to memory 120 for instruction and data storage and for storage of graphics commands, data and textures. The MCH 116 directs data signals between processor 102, memory 120, and other components in the system 100 and bridges the data signals between processor bus 110, memory 120, and system I/O 122. In some embodiments, the system logic chip 116 provides a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices. Some examples are the audio controller, firmware hub (BIOS) 128, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

In one embodiment, a charge pump self initialization mechanism 106 resides in flash memory BIOS 128. Alternate embodiments of a self initialization mechanism 126 can also be used in microcontrollers, embedded processors, graphics devices, DSPs, and other types of logic circuits.

For another embodiment of a system, one implementation of a charge pump self initialization mechanism can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip. By including one embodiment of the present invention on the system on a chip, the charge pumps can self initialize and lower power consumption. The flash memory can be enabled to program and erase flash memory cells without requiring a high voltage pin on the system on a chip pin-out. The needed high voltage potentials can be generated on the same die.

Figure 2:
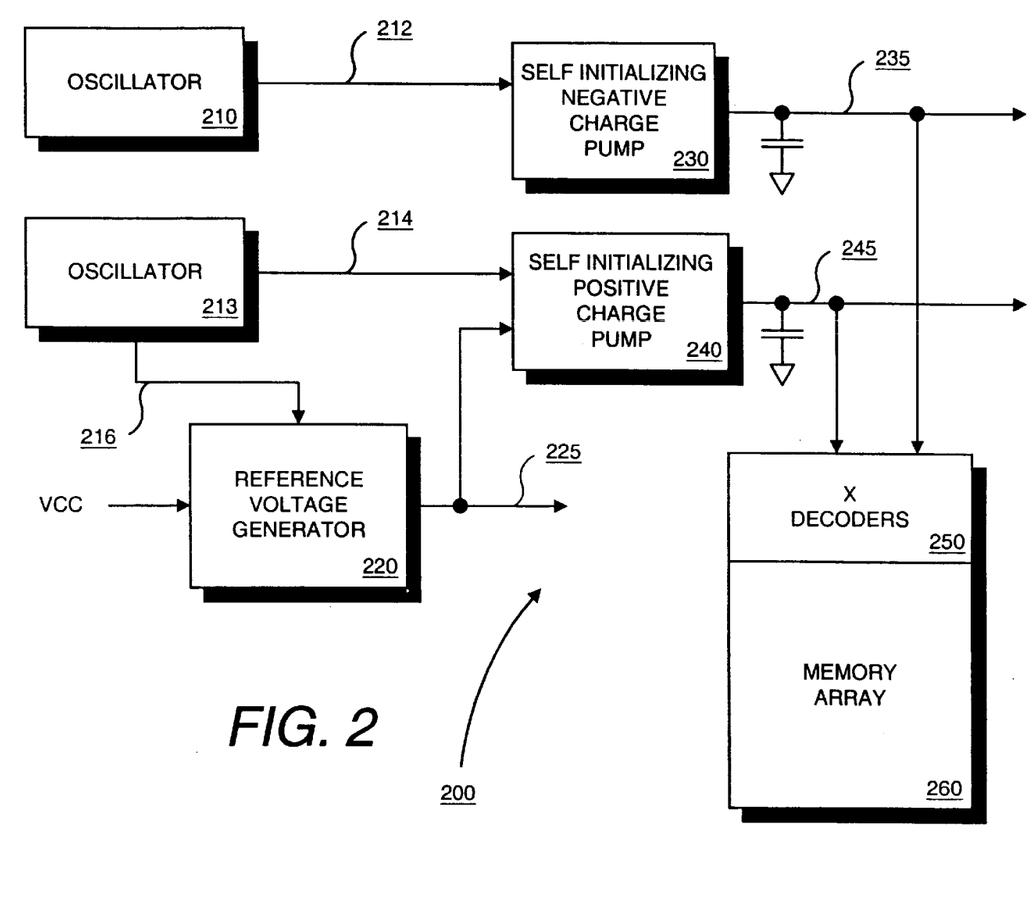
FIG. 2 is one embodiment of a flash memory circuit using self initialization for charge pumps.

FIG. 2 is a flash memory circuit 200 using a gate enhancement charge pump of one embodiment. Reference generator 220 provides a reference voltage 225 to the positive pump 240. For one embodiment, the positive charge pump 240 and negative charge pump 230 include a self initialization mechanism. The positive pump 240 provides a regulated voltage of approximately five volts over decoder supply line 245 to the X-decoders 250 of the memory array 260. The negative pump provides a voltage of approximately negative five volts over decoder supply line 235 to the X-decoders of memory array 260. A first oscillator 210 provides a clock signal 212 that periodically pulses or enables the negative pump 230 during standby mode. A second oscillator 213 provides clock signals 214, 216 that periodically pulse or enable the positive pump 240 and the reference generator 220, respectively, when they are in a standby mode. The clock signals 212, 214, 216 may each have a different frequency.

Figure 3:
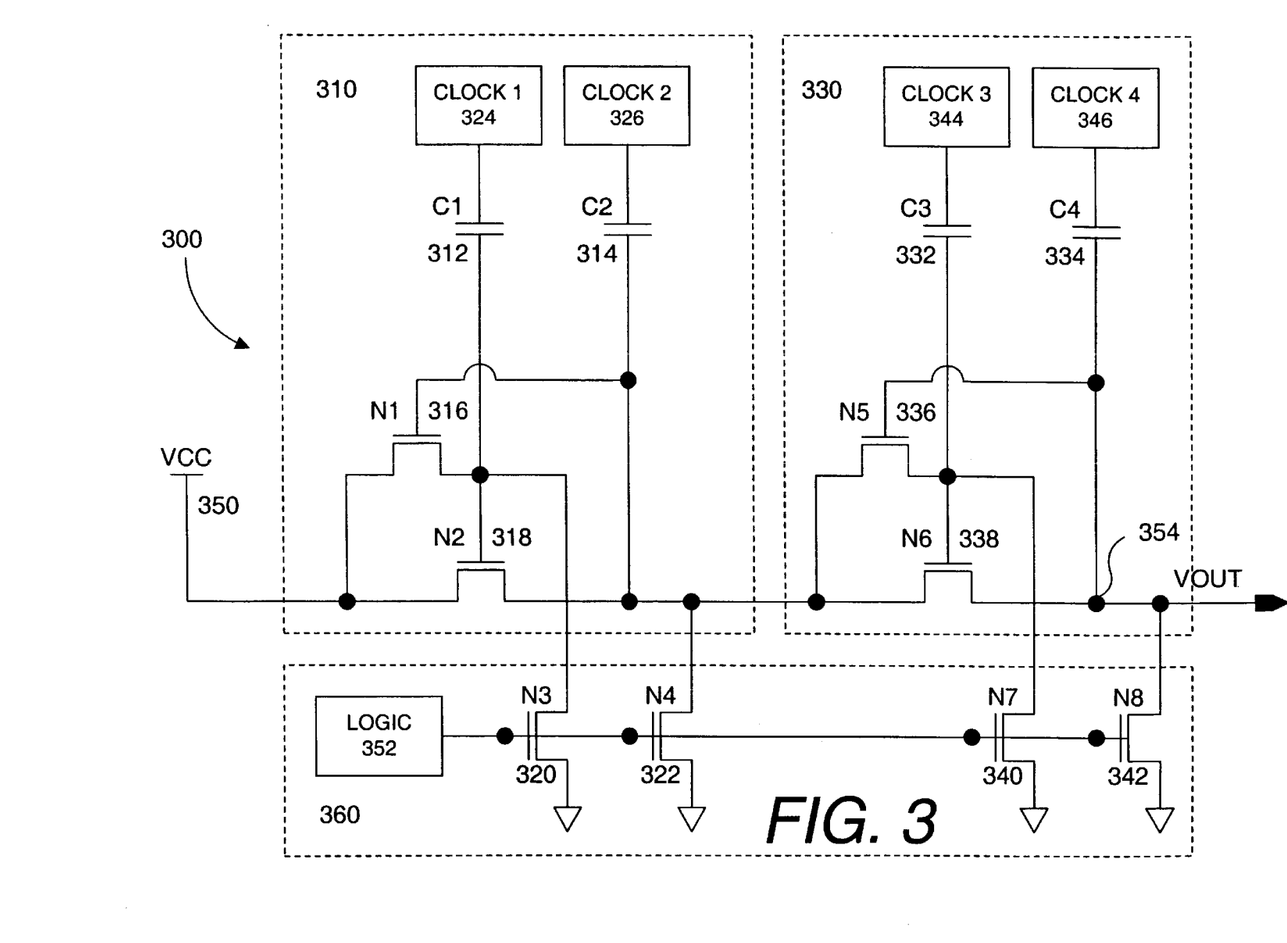
FIG. 3 is a circuit diagram of one embodiment of a two stage positive charge pump with voltage initialization.

Flash memory components often include high voltage charge pumps, such as a program pump or wordline pump, used in program or erase algorithms. The pump of one embodiment is designed such that its internal nodes are grounded when the pump is off. FIG. 3 is a circuit diagram of one embodiment of a two stage positive charge pump 300 with voltage initialization. A pump cell (stage) in this example is defined as including N1 316, N2 318, C1 312, and C2 314. Charge pump 300 of this embodiment comprises a first pump stage 310 and a second pump stage 330. The embodiment of FIG. 3 includes N type field effect transistor devices N2 318 and N6 338 coupled in series between a supply source VCC 350 and a pump output terminal VOUT 354. Each stage of the pump 300 includes an N type device N1 316 and N5 336 to control the voltage potential at the gate terminal of the coupling transistor N2 318 and N6 338 of that respective stage. The source terminal of N1 316 is coupled to the drain terminal of N2 318 and the drain terminal of N1 316 is coupled to the gate terminal of N2 318. The gate terminal of N1 316 is coupled to the source terminal of N2 318 at the pump output of stage 1 310. The source terminal of N5 336 is coupled to the drain terminal of N6 338 and the drain terminal of N5 336 is coupled to the gate terminal of N6 338. The gate terminal of N5 336 is coupled to the source terminal of N6 338 at the pump output of stage 2 330. The boot nodes of each stage 410, 430 are at the gate terminals of switching devices N2 418, N6 438, respectively. Pump nodes exist at the source terminals of N2 418 and N6 438.

Each stage also includes a pump capacitor C1 312, C3 332, and a boot capacitor C2 314, C4 334. Clock signals 1 and 3 are supplied from Clock 1 324 and Clock 3 344, respectively, via capacitors C1 312 and C3 332 at a first terminal. The second terminal of C1 312 is coupled to the gate terminal of coupling device N2 318. The second terminal of C3 332 is coupled to the gate terminal of coupling device N6 338. Clock signals 2 and 4 are supplied to the circuit 300 from Clock 2 326 and Clock 4 346, respectively, via capacitors C2 314 and C4 334 at a first terminal. The second terminal of C2 314 is coupled to the gate terminal of N1 316 and the source terminal of N2 318. The second terminal of C4 334 is coupled to the gate terminal of N5 336 and the source terminal of N6 338.

The self initialization mechanism 360 for the charge pump 300 of this embodiment includes logic 352 and N type transistor devices N3 320, N4, 322, N7 340, and N8 342. Logic 352 is coupled to the gate terminals of N3 320, N4 322, N7 340, and N8 342, and controls their operation. Transistors N3 330 and N4 322 are used for initializing the first stage 310. Transistors N7 340 and N8 342 are used for initializing the second stage 310. The drain terminal of initialization devices N3 320 and N7 340 are coupled to the gate terminal of coupling transistor N2 318 and N6 338 of the first pump stage 310 and the second pump stage 330 respectively. The drain terminal of initialization devices N4 322 and N8 342 are coupled respectively to the output of the first stage 310 and the output of the second stage 330. The source terminals of transistors N3 320, N4 322, N7 340, and N8 342 are coupled to ground.

For the initialization scheme of this embodiment, logic block 352 provides a VCC potential to enable the grounding devices N3 320, N4 322, N7 340, and N8 342 during initialization. N3 320, N4 322, N7 340, and N8 342 can be enabled to ground the internal nodes of the pump cells 310, 330. When the charge pump 300 is turned on, the internal nodes are powered up from the ground potential.

As flash cell programming speed is optimized, efforts are also made to reduce pump warm up time. One embodiment of the present invention is designed to improve the warm up time of the charge pump. Embodiments of the present self initialization scheme can also take advantage of the charge pump's own output voltage by charge sharing with its powerdown switches to initialize the pump's internal nodes when the pump shuts off. While this initialization scheme involves switching different voltages, the implementation of different embodiments can be straight forward through the use of logic and delay circuitry.

Figure 4:
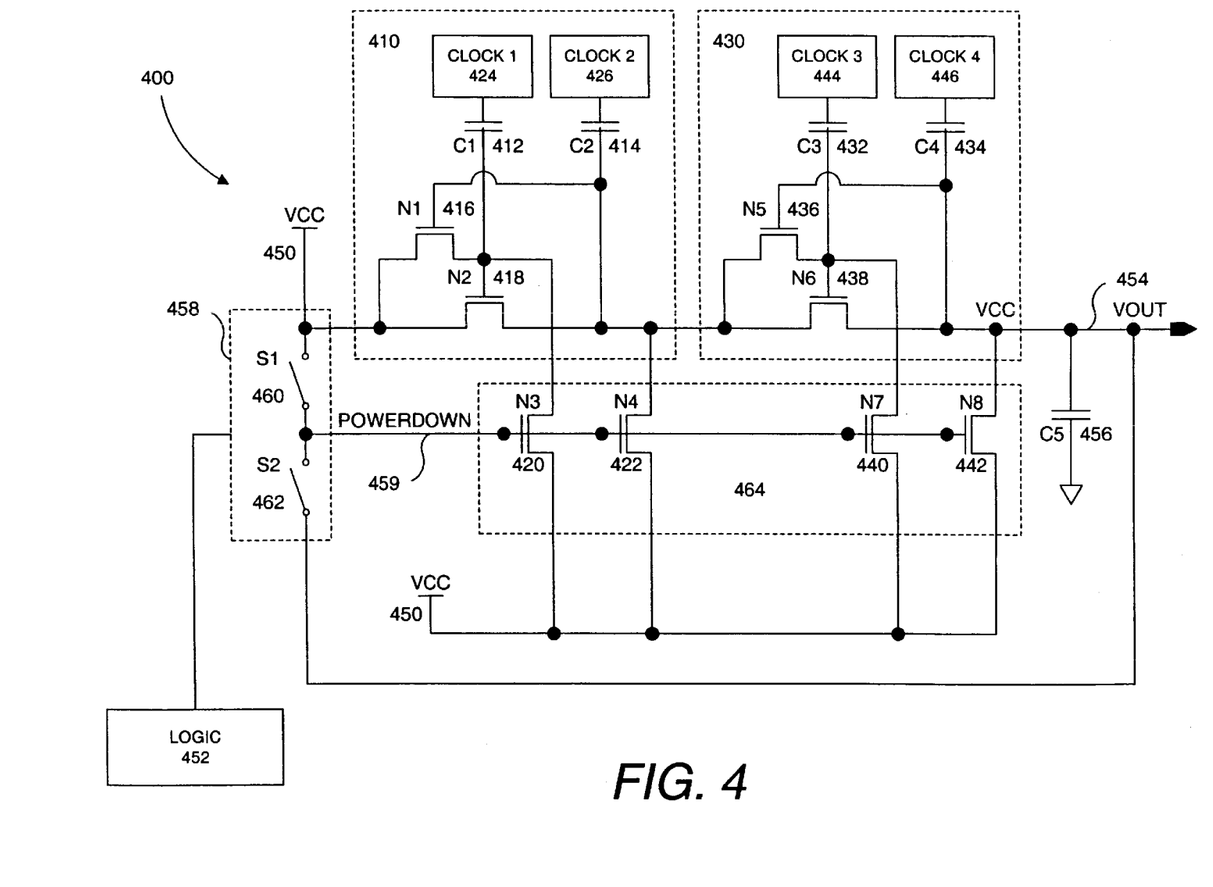
FIG. 4 is a circuit diagram of one embodiment of a two stage positive charge pump with VCC initialization.

FIG. 4 is a circuit diagram of one embodiment of a two stage positive charge pump 400 with VCC initialization. Charge pump 400 of this embodiment includes a first pump stage 410 and a second pump stage 430. The embodiment of FIG. 4 includes N type field effect transistor devices N2 418 and N6 438 coupled in series between a supply source VCC 450 and a pump output terminal VOUT 454. The charge pump 400 of this embodiment has a large capacitor C5 456 of approximately 100 pico Farads (pF) coupled to VOUT 354. C5 456 stores some of the charge generated by the pump 400.

Each stage of the pump 400 includes an N type device N1 416 and N5 436 to control the voltage potential at the gate terminal of the coupling transistor N2 418 and N6 438 of that respective stage. The source terminal of N1 416 is coupled to the drain terminal of N2 418 and the drain terminal of N1 416 is coupled to the gate terminal of N2 418. The gate terminal of N1 416 is coupled to the source terminal of N2 418 at the pump output of stage 1 410. The source terminal of N5 436 is coupled to the drain terminal of N6 438 and the drain terminal of N5 436 is coupled to the gate terminal of N6 438. The gate terminal of N5 436 is coupled to the source terminal of N6 438 at the pump output of stage 2 430.

Each stage also includes a pump capacitor C1 412, C3 432, and a boot capacitor C2 414, C4 434. Clock signals 1 and 3 are supplied from Clock 1 424 and Clock 3 444, respectively, via capacitors C1 412 and C3 432 at a first terminal. The second terminal of C1 412 is coupled to the gate terminal of coupling device N2 418. The second terminal of C3 432 is coupled to the gate terminal of coupling device N6 438. Clock signals 2 and 4 are supplied to the circuit 400 from Clock 2 426 and Clock 4 446, respectively, via capacitors C2 414 and C4 434 at a first terminal. The second terminal of C2 414 is coupled to the gate terminal of N1 416 and the source terminal of N2 418. The second terminal of C4 434 is coupled to the gate terminal of N5 436 and the source terminal of N6 438.

The self initialization mechanism for the charge pump 400 of this embodiment includes logic 452, switching mechanism 458, and initialization mechanism 464. Switching mechanism 458 includes switches S1 460 and S2 462. The initialization mechanism includes N type transistor devices N3 420, N4, 422, N7 440, and N8 442. Logic 452 is coupled to the switching mechanism 458 and controls operation of S1 460 and S2 462. The POWERDOWN signal 459 is supplied through the back to back switches S1 460 and S2 462 to be connected to VCC or the output voltage of the algorithm pump 400. Switch S1 460 can be activated to electrically connect a VCC supply potential 450 to the POWERDOWN node 459. Similarly, switch S2 462 can be activated to electrically connect the charge pump output VOUT 454 to the POWERDOWN node 459. For this embodiment, S1 460 and S2 462 are mutually exclusive in that S1 460 is open while S2 462 is open and S2 462 is closed while SI 460 is open.

POWERDOWN 459 is coupled to gate terminals of N3 420, N4 422, N7 440, and N8 442, and controls their operation. Transistors N3 430 and N4 422 are used to initialize the first stage 410. Transistors N7 440 and N8 442 are used to initialize the second stage 410. The drain terminal of initialization devices N3 420 and N7 440 are coupled to the gate terminal of coupling transistor N2 418 and N6 438 of the first pump stage 410 and the second pump stage 430 respectively. The drain terminal of initialization devices N4 422 and N8 442 are coupled respectively to the output of the first stage 410 and the output of the second stage 430.

One feature of this present embodiment is to have all of the internal pump nodes initialized to a VCC potential instead of ground as in the embodiment of FIG. 3. The source terminals of transistors N3 420, N4 422, N7 440, and N8 442 are coupled to a VCC supply potential 450. When the charge pump 400 is off, the initialization devices N3 420, N4 422, N7 440, and N8 442 are activated to initialize the internal pump nodes to a VCC potential. While the charge pump 400 of one embodiment of is being initialized, snap-back is eliminated on the initialization devices N7 440 and N8 442 of the last pump stage 430 and the output switch.

The logic block 452 controls which back to back switch to turn on at different phases of the pump operation. Three phases are considered in the present embodiment.

Phase 1: The charge pump 400 is on and POWERDOWN 459 is connected to VCC 450 via switch S1 460. The VCC potential on POWERDOWN 459 prevents N3 420, N4 422, N7 440, and N8 442 from turning on since the source terminal these devices are also at a VCC potential.

Phase 2: The charge pump 400 is shut down, but before the pump output VOUT 454 is discharged to a VCC level, the charge that is stored in capacitor C5 456 is sent through switch S2 462 to supply the gate terminals of N3 420, N4 422, N7 440, and N8 442 to quickly discharge all the internal pump nodes down to a VCC level.

Phase 3: After the gate terminals of N3 420, N4 422, N7 440, and N8 442 are charged shared with the pump output voltage 454, the gate terminals are then discharged via S1 460 as soon as the internal pump nodes have been discharged. The pump output 454 is then discharged down to a VCC level to complete the pump shut off.

Embodiments of the present initialization scheme do not depend on external voltage sources. A charge pump including an embodiment of the present invention can takes advantage of its own output voltage to perform self initialization. Power consumption can also be reduced by incorporating an embodiment of the present invention into a charge pump since the pump is powered up from a VCC potential rather from a ground potential.

Alternative embodiments of the self initialization mechanism can also be used with a negative charge pump. However, instead of initializing the internal pump nodes to a VCC potential, the internal nodes may be initialized to a ground potential in one embodiment. The stored negative charge at the output of the negative pump can be used to feed the gate of the initialization devices through a switch. These devices in turn initialize the internal pump nodes.

Figure 5:
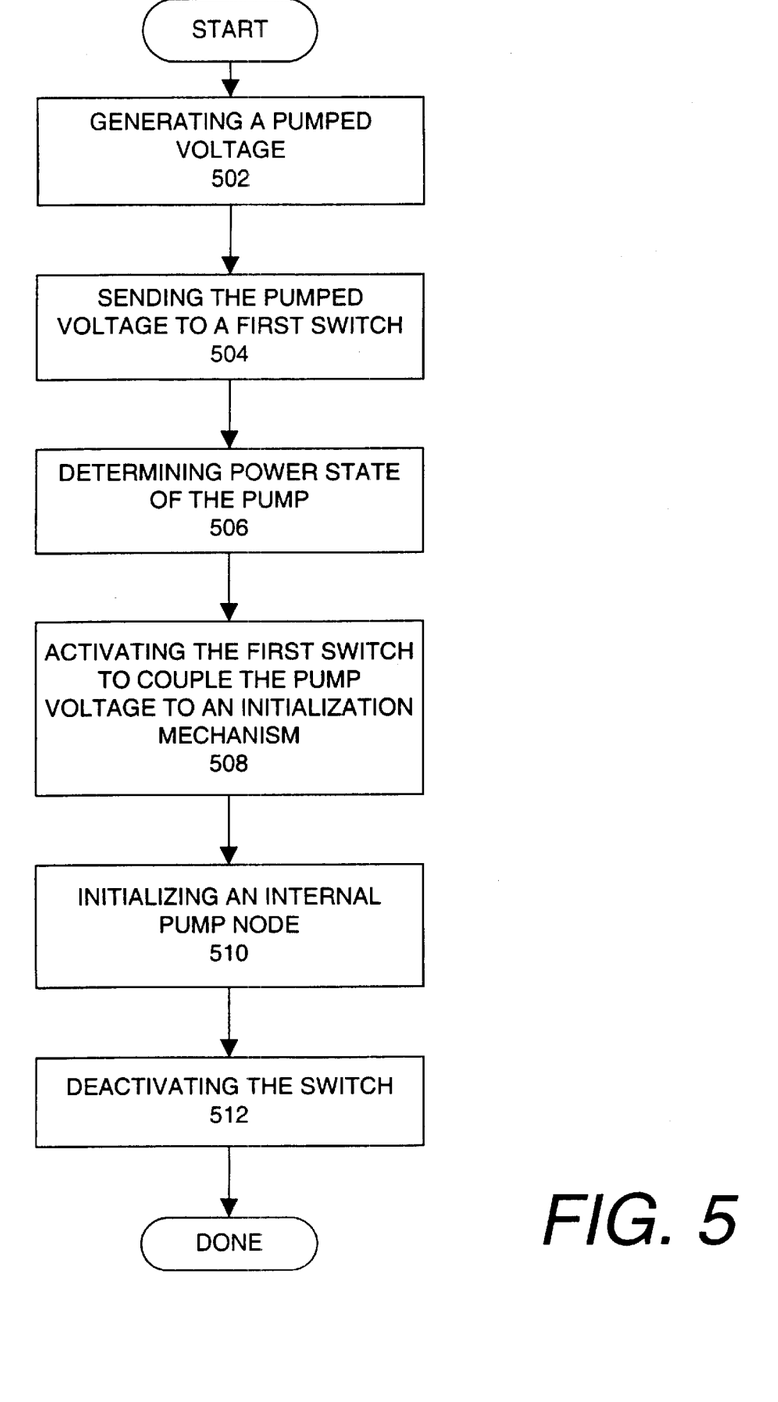
FIG. 5 is a flow diagram of one embodiment illustrating the method of self initialization of a charge pump to VCC.

FIG. 5 is a flow diagram illustrating the method of self initialization of a charge pump to VCC for one embodiment. This example generally describes the operation of initializing internal pump nodes. At step 502, a pumped voltage is generated. The pumped voltage of this embodiment is the voltage available at the charge pump output. This pumped voltage is greater than the supply voltage. The pump output is coupled to a first switch at step 504. This first switch can electrically connect the pumped voltage to other circuitry when necessary. For one embodiment, this first switch is part of a set of back to back switches. The second switch is coupled to a supply voltage such as VCC. The other end of the switches are coupled together to provide a control signal to an initialization mechanism. Depending on which switch is enabled, the voltage potential on that switch is passed to the control signal. The power state of the pump is determined at step 506. This determination can be performed by the associated logic circuit coupled to the switches. Power states in this context is defined as operating state. For instance, such states can include pump on, pump off, and pump stand-by.

Depending on what power state the pump is in, the logic can enable one of the switches to pass the voltage coupled to that switch. If the logic determines that the pump is at a power state in which the internal pump nodes should be initialized, the first switch is activated at step 508 to couple the pumped voltage to an initialization mechanism. The initialization mechanism of this embodiment includes a plurality of transistor devices that can coupled an initialization voltage to internal nodes of the charge pump.

The control signal coupled to the gate terminal of these transistor devices can turn the devices on or off depending on the voltage potential of the control signal. The initialization voltage of one embodiment is a VCC supply voltage. Thus when the initialization mechanism is enabled, the internal pump nodes are initialized to a VCC level. If an internal node being initialized is greater than the initialization voltage, then that node is lowered to the initialization voltage. If the internal node is less than the initialization voltage, then that node can be raised to the initialization voltage. The logic deactivates the first switch at step 512 to stop the initialization of the internal pump nodes. The logic can also then enable the second switch to couple the control signal to the supply voltage, thus discharging the control signal to the supply voltage potential.

If the power state of the charge pump is determined to be pump on or some non-initialization mode at step 506, then the first switch is not enabled. The logic can enable the second switch instead to provide a supply voltage to the control signal, which in turn would go to the gate terminals of the transistor devices in the initialization mechanism. For one embodiment, this supply voltage does not turn on the transistor devices and the internal pump nodes are not being initialized to VCC.

The cycle from step 502 to step 512 can be executed during a pump shutdown procedure to initialize the internal pump nodes. The cycle can also be executed when placing the charge pump into standby mode.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:
    generating an output voltage internally within a circuit, said output voltage having a voltage potential different from that of a supply voltage;
    determining whether said circuit is in a first power state wherein generation of said output voltage will cease;
    coupling said output voltage to a self initialization mechanism for said circuit if said circuit is in said first power state;
    initializing an internal node within said circuit to a first voltage potential with said self initialization mechanism; and
    decoupling said output voltage from said self initialization mechanism after said internal pump node is charged to a desired level.

2. The method of claim 1 wherein said first voltage potential is less than that of said output voltage.

3. The method of claim 1 wherein said first voltage potential is greater than that of said output voltage.

4. The method of claim 1 wherein said first voltage potential is less than that of said supply voltage.

5. The method of claim 1 wherein said first voltage potential is greater than that of said supply voltage.

6. The method of claim 1 wherein said first power state is either a shutdown condition, a standby condition, or an idle condition.

7. The method of claim 6 further comprising discharging said output voltage after said internal node is initialized.

8. The method of claim 7 further comprising determining whether said circuit is in a second power state.

9. The method of claim 8 further comprising coupling said supply voltage to said self initialization mechanism if said circuit is in said second power state.

10. The method of claim 9 wherein said second power state is an active circuit condition.

11. The method of claim 1 wherein said self initialization mechanism comprises a first switching device to couple and decouple said output voltage to said internal node.

12. The method of claim 11 wherein said self initialization mechanism further comprises a second switching device to couple and decouple said supply voltage to said internal node.

13. The method of claim 12 wherein said initializing further comprises discharging said internal node to a desired voltage potential.

14. An apparatus comprising:
- an analog circuit to generate an output voltage from a supply voltage, said output voltage having a voltage potential different from that of said supply voltage;
- a self initialization mechanism coupled to said analog circuit, said self initialization mechanism to receive said output voltage and said supply voltage; and
- control logic coupled to said self initialization mechanism, said control logic to control initialization of an internal node within said analog circuit to a desired voltage level.

15. The apparatus of claim 14 wherein said self initialization mechanism comprises a switching device to selectively couple and decouple said output voltage to said internal node and to selectively couple and decouple said supply voltage to said internal node.

16. The apparatus of claim 15 wherein said control logic provides a control signal to said self initialization mechanism to control operation of said switching device.

17. The apparatus of claim 16 wherein said initialization mechanism is activated to initialize said internal node with said output voltage if said analog circuit is in a shutdown, standby, or idle power state.

18. The apparatus of claim 17 wherein said initialization mechanism is activated to initialize said internal node with said supply voltage if said analog circuit is in its active power state.

19. The apparatus of claim 18 wherein said analog circuit is a positive charge pump circuit.

20. The apparatus of claim 18 wherein said analog circuit is a negative charge pump circuit.

* * * * *

UNITED STATES PATENT AND TRADEMARK OFFICE
CERTIFICATE OF CORRECTION

PATENT NO. : 6,441,678 B1 Page 1 of 1
DATED : August 27, 2002
INVENTOR(S) : Zeng et al.

It is certified that error appears in the above-identified patent and that said Letters Patent is hereby corrected as shown below:

Title page, Item [54] and Column 1, line 2,
Delete "FORCHARGE" and insert -- FOR CHARGE --.

Signed and Sealed this

Twenty-eighth Day of January, 2003

JAMES E. ROGAN
*Director of the United States Patent and Trademark Office*